United States Patent [19]

Tokutomi et al.

[11] Patent Number: 4,600,830
[45] Date of Patent: Jul. 15, 1986

[54] FOCUS DETECTING DEVICE

[75] Inventors: Seijiro Tokutomi; Osamu Shindo; Hideaki Yuda, all of Tokyo, Japan

[73] Assignee: Asahi Kogaku Kogyo K.K., Tokyo, Japan

[21] Appl. No.: 529,780

[22] Filed: Sep. 6, 1983

[30] Foreign Application Priority Data

Sep. 6, 1982 [JP] Japan .................. 57-154773

[51] Int. Cl.⁴ ............................................. G01J 1/20
[52] U.S. Cl. .................................... 250/201; 250/226; 354/402
[58] Field of Search .............. 250/201, 204, 226, 333; 354/402, 102, 400; 356/1, 4, 406, 416, 419

[56] References Cited

U.S. PATENT DOCUMENTS

| | | | |
|---|---|---|---|
| 3,748,471 | 7/1973 | Ross et al. | 250/333 |
| 4,309,604 | 1/1982 | Yoshikawa et al. | 356/402 |
| 4,450,547 | 5/1984 | Nakamura et al. | 250/204 |

FOREIGN PATENT DOCUMENTS 2077421 12/1981 United Kingdom ................ 250/201

Primary Examiner—David C. Nelms
Assistant Examiner—Michael Messinger
Attorney, Agent, or Firm—Sughrue, Mion, Zinn Macpeak & Seas

[57] ABSTRACT

A focus detecting device for optical devices such as cameras and microscopes, which like the human eye, can detect a point of focus in response not only to the contrast of an object but also to differences in hue. The invention provides a device which provides a measurement of contrast from an image projected onto sensors separated according to different ranges of wavelength. Focus is detected by the sensors as they measure the differences in the intensity of incident light reflected from an object under focus. The sensors also provide a measure of contrast in response to different wavelength ranges.

6 Claims, 14 Drawing Figures

FOCUS DETECTING DEVICE

BACKGROUND OF THE INVENTION

The present invention relates to an improved focusing device for an optical apparatus such as a camera or microscope. More particularly, the invention relates to a focus detecting device which, like the human eye, can detect a point of focus from not only the contrast of an object but also its differences in hue.

In a conventional focus detecting device, the image of an object is projected onto a sensor made up of a plurality of light-receiving elements. The photoelectric conversion outputs of the light-receiving elements are processed according to a predetermined conventional algorithm such as may be employed for contrast detecting or correlation detecting to thus determine whether or not the image of the object is properly focused.

In the case where the object is a monochromatic flat surface, it is impossible for the above-described device to determine whether or not the object is in focus because the outputs of the light-receiving elements are equal due to the fact that the intensity distribution of such an object does not vary. Even the human eye cannot focus on such objects.

On the other hand, where the object is a uniformly illuminated flat surface divided by a boundary into two areas of different colors, while the human eye can focus on such an object, the above-described prior art focus detecting device cannot. The reason for this is that the human eye utilizes not only brightness variations but also differences in hue to detect a boundary between areas of different color in focusing on such objects. In the above-described prior art device, a photoelectric conversion output is obtained by integrating the product of the spectral distribution characteristic of incident light and the spectral sensitivity characteristic of a sensor. Accordingly, even if the surface has different colors, the outputs of the sensors for the boundary may be equal depending on the particular combination of colors then present. In this case, as in the case of monochromatic incident light, the device cannot determine whether or not focalization is obtained.

Detection of focus using the contrast detecting method is based on the theory that when an image formed at a given plane is in proper focus, the difference in intensity between light and dark areas, that is, the contrast of the image, is a maximum. This situation is shown graphically in FIG. 1. Such a method can be implemented by detecting the point at which the high frequency component of the spatial frequency distribution of an image reaches a maximum. A conventional method of detecting the high frequency component of an image employs a sensor array composed of a plurality of light-detecting elements which have uniform photoelectric characteristics and are arranged in a line as shown in FIG. 2. The example described in FIG. 2 shows five linearly arranged light-detecting elements set in a plane in parallel with the image plane. The high frequency component is detected from the difference between the outputs of adjacent light-receiving elements.

If the object is a monochromatic edge chart having a dark right half (shaded) and a light left half as shown in FIG. 3 and the image of this chart is projected onto the sensor array of FIG. 2, as depicted in FIG. 4, the outputs of the elements of the sensor array will be as shown in FIG. 5. In FIG. 5, the positions of the light-receiving elements are indicated on the horizontal axis and the amplitude of the photoelectric conversion outputs on the vertical axis. The photoelectric conversion output of each element is the product of the intensity of the incident light and the integral, with respect to wavelength, of the product of the spectral sensitivity characteristic of the element and the spectral distribution characteristic of the incident light. Since all of the elements have the same spectral characteristics, the output distribution depends only on the intensity of the incident light. For the monochromatic edge chart shown in FIG. 3, the outputs of the first, second and third elements corresponding to the light region are large, while the outputs of the fourth and fifth elements corresponding to the dark region are small. The output distribution in the boundary between the light and dark regions is detected as a measure of contrast, the value of which changes as the image is brought into focus, as described above in reference to FIG. 1.

The case will now be considered in which an edge chart made up of different hues a and b as shown in FIG. 6 is employed, and the boundary of the edge chart is positioned on the sensor array as shown in FIG. 4 (boundary indicated by triangular marks). The spectral distribution characteristics of the light beams reflected from the different regions a and b and the spectral sensitivity characteristic of the sensors can be represented by $a(\lambda)$, $b(\lambda)$ and $s(\lambda)$, respectively, as shown in FIG. 7. The radiant intensities of the light beams reflected from the different regions can be represented by A and B, respectively. Therefore, the output $P_1$ of each of the first, second and third elements is:

$$P_1 = A \cdot \int a(\lambda) \cdot s(\lambda) d\lambda.$$

Similarly, the output $P_2$ of each of the fourth and fifth elements is:

$$P_2 = B \cdot \int b(\lambda) \cdot s(\lambda) d\lambda.$$

It is apparent from these formulas that if the intensities A and B differ, then the integrated outputs $P_1$ and $P_2$ may nevertheless be equal, depending upon the spectral distribution characteristics $a(\lambda)$ and $b(\lambda)$. Likewise, if the spectral distribution characteristics $a(\lambda)$ and $b(\lambda)$ differ, the integrated outputs $P_1$ and $P_2$ may still be equal, depending on the intensities A and B. In the situation where the photoelectric conversion outputs of all the elements are equal, it is impossible to detect the boundary of the edge chart.

Accordingly, an object of this invention is to provide a focus detecting device which can respond to differences in hue as well as intensity, thus providing a wider operating range than a conventional focus detecting device which utilizes only an integration value derived from a measurement of the incident light energy.

SUMMARY OF THE INVENTION

The above drawbacks are eliminated in a focus detecting device of the invention which includes first and second light sensing means which are sensitive to different ranges of wavelengths of received light. The outputs of the two light sensing means are separately detected according, for instance, to a standard contrast detecting method, and then summed together to provide an output focus detecting signal. In one preferred embodiment, the light sensing means are implemented as arrays of light detecting elements provided with filters which pass different ranges of wavelengths of received light. The arrays may be linear arrays arranged parallel to the adjacent to one another. In another preferred embodiment, the light detecting means are implemented with a split-lens arrangement employing a correlation method.

DESCRIPTION OF THE PREFERRED EMBODIMENTS

The invention will now be described in detail with reference to preferred embodiments in which the concept of the invention is applied to a focus detecting device operating according to a method of detecting focus from the contrast of an object.

Figure 8:
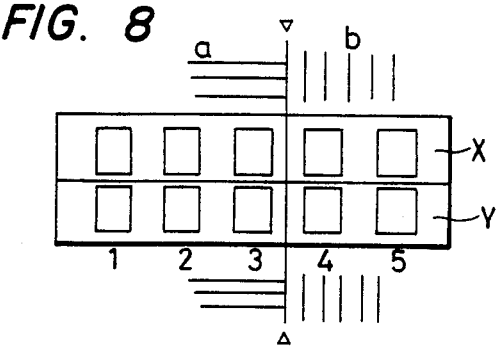
FIG. 8 is an explanatory diagram showing the image of the two-color edge chart which is projected onto a sensor according to a preferred embodiment of the invention.
Figure 9:
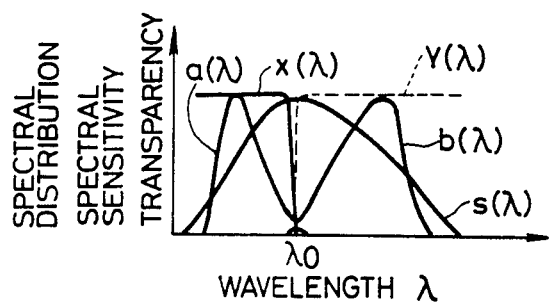
FIG. 9 is a graphical representation indicating spectral characteristic curves of the two-color regions of the edge chart, the sensor and the color filters of FIG. 8.

In the focus detecting device of the invention, two sensor arrays X and Y are provided as shown in FIG. 8. Filters having spectral sensitivity characteristics $x(\lambda)$ and $y(\lambda)$ as shown in FIG. 9 are positioned over the sensor arrays X and Y, respectively. According to this arrangement, a different photoelectric conversion output distribution is detected by each array.

Figure 1:
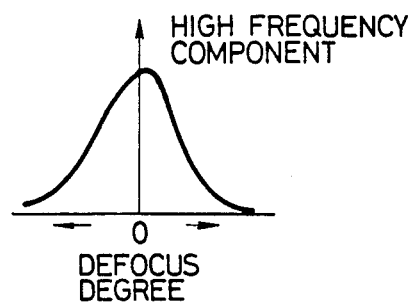
FIG. 1 is a graphical representation indicating an image high frequency component on vertical axis and a degree of defocusing on the horizontal axis.
Figure 2:
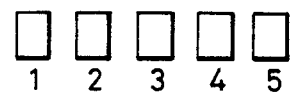
FIG. 2 is an explanatory diagram showing a sensor made up of a plurality of light-receiving elements.
Figure 3:
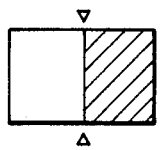
FIG. 3 is an explanatory diagram showing an edge chart.
Figure 4:
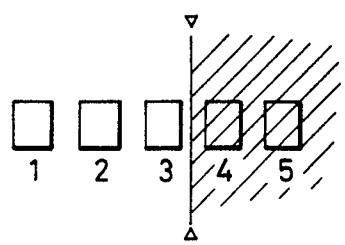
FIG. 4 is an explanatory diagram showing the image of the edge chart of FIG. 3 projected onto the sensor of FIG. 2.
Figure 5:
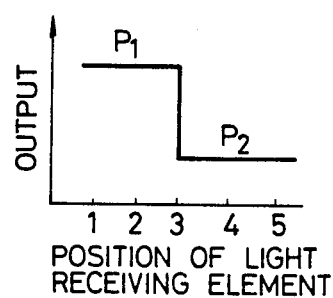
FIG. 5 is a graphical representation indicating a distribution of outputs of light-receiving elements on the vertical axis and positions of light-receiving elements on the horizontal axis.
Figure 6:
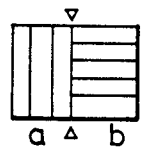
FIG. 6 is an explanatory diagram showing a two-color edge chart.
Figure 7:
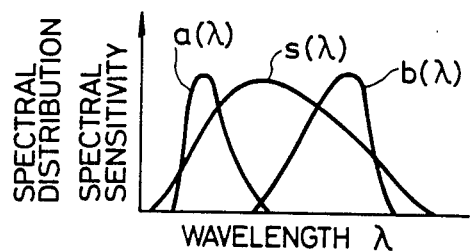
FIG. 7 is a graphical representation indicating spectral characteristic curves of the two color regions of the edge chart of FIG. 6 and of the sensor.

With reference now to FIG. 9, it is assumed that the filter having the spectral sensitivity characteristic $x(\lambda)$ transmits light rays of wavelengths which are generally below a wavelength $\lambda_0$. The other filter having the spectral sensitivity characteristic $y(\lambda)$ transmits light rays of wavelengths generally above the wavelength $\lambda_0$. It is further assumed that the edge chart and the boundary are positioned similarly as shown in FIGS. 4 and 6.

The output of the array X is then:

$$P_X = A \cdot \int a(\lambda) \cdot s(\lambda) \cdot x(\lambda) d\lambda,$$

while the output of the array Y is:

$$P_Y = B \cdot \int b(\lambda) \cdot s(\lambda) \cdot y(\lambda) d\lambda.$$

Figure 10:
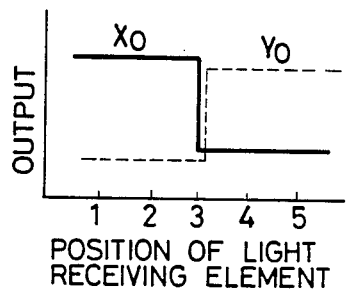
FIG. 10 is a graphical representation showing the distribution of the outputs of the light-receiving elements of FIG. 8.
Figure 11:
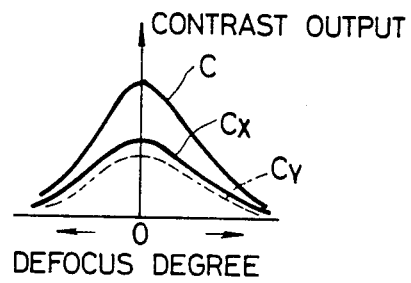
FIG. 11 is a graphical representation indicating a contrast output characteristic curve derived from the outputs of the sensor shown in FIG. 8.
Figure 13:
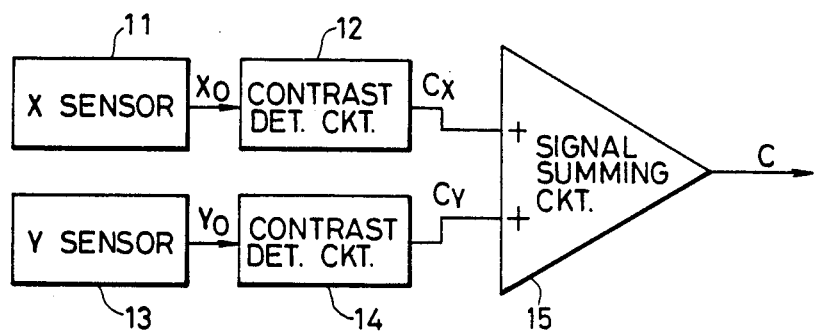
FIG. 13 is a circuit diagram of a circuit used to detect and combine sensor outputs to produce a focus detection signal.

The output distribution of an image from a sensor of the invention is shown in FIG. 10. $X_0$ designates the output of the array X and $Y_0$ the output of the array Y. As is apparent from FIG. 10, the output distribution corresponding to the boundary of the edge chart is detected between the third and fourth elements. Two contrast outputs, $C_X$ and $C_Y$ as shown in FIG. 11, are obtained by performing an ordinary contrast detecting operation on the signals $X_0$ and $Y_0$. This is illustrated by the circuitry shown in FIG. 13. The outputs from X and Y sensor arrays 11 and 13 are applied to respective standard contrast detecting circuits 12 and 14. The signals $C_X$ and $C_Y$ produced by the circuits 12 and 14 are summed together by a signal summing circuit 15 to yield the output focus detecting signal C.

In the above-described preferred embodiment of the invention, the sensor arrays X and Y are provided with filters. Two kinds of filters may be joined together, or an IC manufacturing process for manufacturing the filters together with the remainder of the sensor array may also be employed. Furthermore, instead of using filters, the individual spectral sensitivity characteristics of the light-receiving elements may be modified.

The invention has been described with reference to the contrast-type focus detecting method. However, it should be noted that the invention is not limited thereto. That is, the invention can be applied effectively to a device operating according to a correlation method.

Figure 12A:
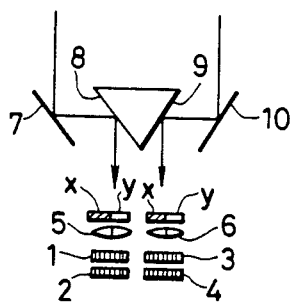
FIG. 12A is an explanatory diagram showing a second preferred embodiment of the invention incorporated in a correlation type focalization detecting device.
Figure 12B:
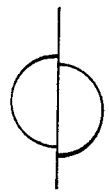
FIG. 12B is an explanatory diagram showing the structure of a projecting lens in the preferred embodiment of FIG. 12A.

A second embodiment of the invention in which the invention is applied to a conventional image alignment system will now be described. In FIG. 12A, sensors 1, 2, 3 and 4, projecting lenses 5 and 6, and mirrors 7, 8, 9 and 10 are positioned as shown. As indicated in FIG. 12B, each of the projecting lenses 5 and 6 is constructed by dividing a single lens into two parts. As the parts are shifted slightly one from another along a vertical dividing line, the lenses 5 and 6 cooperate to form two equal images one above the other. The sensors 1 and 3, first halves of the lenses 5 and 6 on the same side, and the mirrors 7–10 together form a first correlation-type focus detecting system. The sensors 2 and 4, the remaining halves of the lenses 5 and 6, and the mirrors 7–10 form a second correlation-type focus detecting system. In this embodiment, as in the case of the first-described embodiment employing the contrast detecting method, filters having spectral characteristics $x(\lambda)$ and $y(\lambda)$ as shown in FIG. 9 are provided for the sensors of the two respective focus detecting system. This may be achieved by providing color filters for the sensors 1 and 2 which have different spectral sensitivity characteristics from the filters provided for the sensors 3 and 4. Also, the sensors themselves may be modified so as to have different spectral sensitivity characteristics for each pair. Alternatively, color filters may be placed adjacent to the projecting lens as indicated by x and y in FIG. 12A, or the projecting lens may have two parts having different color characteristics. The two correlation type focus detecting systems, while having different color sensing characteristics as described above, provide focusing using conventional image alignment and also in response to differences in hue.

In the above-described embodiments, the spectral sensitivity range is described as being divided into two parts. This is preferred because, if the range were divided into more parts, although the focussing accuracy may be increased, the structure of the device would necessarily be more intricate. It is also desirable that the spectral characteristic curves of the divided parts be rectangular on either side of the division wavelength. However, they may be curved and overlap with each other to the extent that the sensitivity is not significantly impaired.

We claim:

1. A focus detecting device comprising:
   first and second light sensing means, each of said first and second light sensing means detecting light from adjacent areas having different optical characteristics and being sensitive to a different range of wavelengths of light; and
   means for detecting and summing outputs of said first and second light sensing means to provide a focus detection signal.

2. The focus detecting device of claim 1, wherein said first and second light sensing means each comprise an array of light detecting elements and a filter, the filter of said first light detecting means passing ranges of wavelengths of light different from the ranges of wavelengths of light passed by the filter of said second light detecting means.

3. The focus detecting device of claim 2, wherein said arrays are linear arrays arranged adjacent to and parallel to one another.

4. The focus detecting device of claim 1, wherein said first and second light sensing means each comprise a filter, a split projecting lens, and first and second sensors, disposed in the stated order, the filters of said first and second light detecting means passing different ranges of wavelengths of light.

5. The focus detecting device of claim 4, further comprising mirror means for directing light to said first and second light detecting means.

6. The focus detecting device as claimed in claim 1, wherein the range of wavelengths of light to which the first light sensing meeans is sensitive includes the wavelengths of light predominating in a first of said adjacent areas and absent in a second of said adjacent areas, and the range of wavelengths of light to which said second sensing means is sensitive includes the wavelengths of light predominating in said second area and absent from said first area.

* * * * *